Jan. 23, 1962 M. A. MILLS 3,018,133
HEAD REST FOR AUTOMOBILE SEAT
Filed March 7, 1960
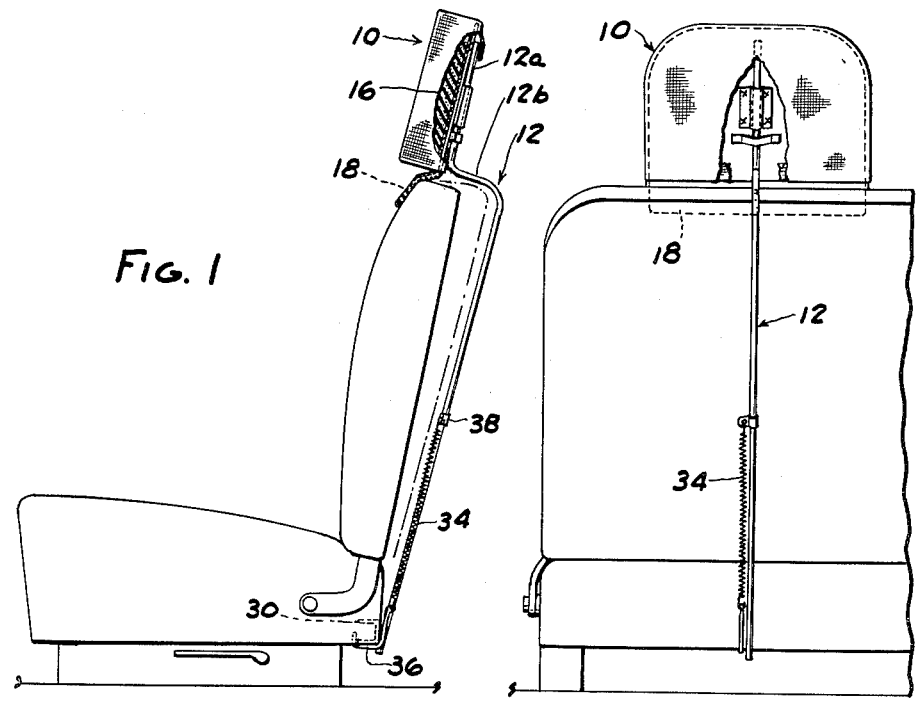
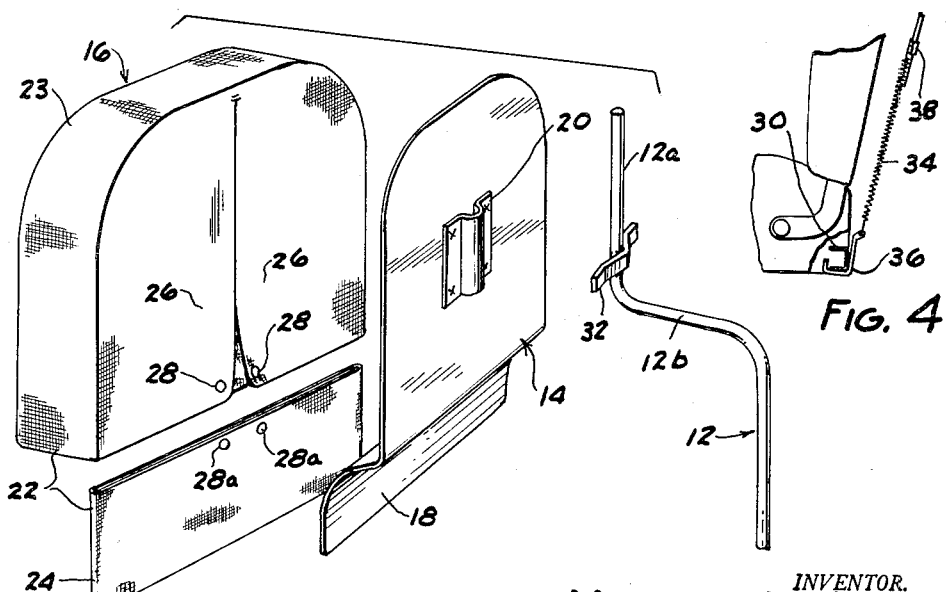
INVENTOR.
MAURICE A. MILLS
BY
WILSON, LEWIS & McRAE
ATTORNEYS

3,018,133
HEAD REST FOR AUTOMOBILE SEAT
Maurice A. Mills, 2725 Bailey St., Dearborn, Mich.
Filed Mar. 7, 1960, Ser. No. 13,225
2 Claims. (Cl. 297—397)

The present invention relates to a head rest for an automobile seat and more particularly to such a head rest which may be easily attached and readily removed and which is supported from rigid structural members of the automobile seat.

The head rest embodying the present invention is particularly adapted to add to the comfort of the passenger occupying the front seat of an automobile.

A variety of devices have previously been proposed for positioning a cushion vertically on the top edge of an automobile seat. However, such prior devices have for the most part utilized inverted U-shaped brackets disposed with the front legs thereof extending a short distance downwardly over the front of the seat back and the rear legs thereof extending a short ways downward along the rear surface of the seat back. Such brackets and means of mounting head cushions have not provided adequate support against rearward tipping of the head cushion for the reason that the lower ends of the rear legs of such brackets bear only against the fabric covering the seat back which fabric is not capable of providing the necessary rigid support.

Some solutions suggested to this problem have envisaged the use of extended framing members that extend downwardly along the front of the seat back so as to be held in position by the weight of the person occupying the seat. However, such a device is not a satisfactory solution because such framing members only add to the discomfort of the person occupying the seat.

Accordingly, it is one object of the present invention to provide a head rest for an automobile seat wherein the support for the head rest is obtained from the seat without interfering with the comfort of the person occupying the seat.

Another object of the present invention is to provide such a head rest that is readily adaptable for use in a wide variety of makes and styles of automobiles.

Another object of the present invention is to provide a head rest for automobile seats that is equally adaptable for use on the passenger side of the front seat as well as on the driver's side.

A further object of the present invention is to provide such a head rest which may be readily affixed without damage to the upholstery of the seat and may be easily removed when and as desired.

Another object of the present invention is to provide a head rest for an automobile seat which does not interfere with the normal functioning of the seat back such as the forward tilting of the seat back in a two door style car.

Other objects of this invention will appear in the following description and appended claims, reference being had to the accompanying drawings forming a part of this specification wherein like reference characters designate corresponding parts in the several views.

In the drawings:

FIG. 1 is a side view of an automoible seat and a head rest embodying the present invention attached thereto.

FIG. 2 is a rear view of the device of FIG. 1.

FIG. 3 is an exploded view of a head rest embodying the present invention as shown in FIGS. 1 and 2.

FIG. 4 is a detailed view of the lower rear portion of the seat and device of FIGS. 1, 2 and 3 with portions broken away to show the means by which the device is held in place on the seat.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, FIG. 1 shows a head rest embodying the present invention positioned on an automobile seat or the like. The device comprises a head support 10 and a brace 12.

Referring to FIG. 3, the head support comprises a backing plate 14 formed of sheet metal or the like and a cushion 16.

The head support is positioned vertically above the top of the seat back. For this purpose the backing plate 14 has formed thereon positioning means such as a forwardly and downwardly extending lip 18 that engages the top front edge of the seat back as shown in FIG. 1. On the back face of the plate 14 there is affixed a U-shaped bracket 20 that receives the upper end of the brace 12. The backing plate may conveniently be formed of sheet metal or plastic or other suitable material.

The cushion 16 is filled with any suitable padding, such as a sponge rubber form as shown in FIG. 1, and is provided with a fabric covering 22 which is utilized to affix the cushion on the front face of the backing plate 14. As shown in FIG. 3, the fabric covering 22 includes an upper covering 23 and a bottom pocket 24. The upper covering 23 has two rear flaps 26 provided with snap fasteners 28, or the like, to engage corresponding snap fasteners 28a on pocket 24 to fasten the flaps down against the upper edge of the pocket 24. To position the cushion 16 on the backing plate 14, the plate is slid up under the flaps 26 and the pocket 24 is then pulled over the lip 18 of the plate 14 and thereafter the flaps 26 are fastened down to the pocket 24 thereby firmly positioning the cushion 16 on the backing plate 14 with the backing plate completely covered and padded.

The brace 12, as will be noted in FIG. 3 and FIG. 1, is made of a metal rod or similar suitable material and is provided at its upper end with a straight portion 12a that is received in the U-shaped bracket 20 provided on the rear face of the backing plate 14. The upper end of the brace may easily be inserted into the bracket 20 by slipping it upwardly between the flaps 26 of the fabric covering. It will be noted from FIG. 1 that the brace 12 curves rearwardly as at 12b to clear the top back edge of the seat back and then extends downwardly adjacent the rear of the seat back but spaced therefrom so that the lower end of the brace 12 engages the bottom edge of the seat only. This clearance between the brace not only assures that the brace does not tear or mar the seat upholstery but also makes the device of the present invention usable in a wide variety of makes and styles of automobiles. I have found that the variation in automobile seat dimensions is largely in the thickness of the seat backs. As indicated by dotted lines in FIG. 1 the back could be thicker and still suitable clearance would be present between the brace and the unsupported fabric across the back of the seat. I have found the brace as constructed according to the present invention suitably compensates for this and other minor variations in the height of the seat.

At the rear bottom edge of automobile seats there is provided a rigid framing member 30 and it is against such a framing member that the lower end of the bracket 12 bears. Thus, the brace supports the head support from a rigid framing member thereby assuring that the head support will not tip backwards.

In order to prevent the brace 12 from twisting in the bracket 20, stabilizing means such as a short metal strap 32 is affixed to the brace at a distance below its upper end sufficient to assure it will not interfere with the insertion of the upper end of the brace into the U-shaped bracket 20. The strap 32 extends on each side of the brace 12 and the ends engage the backing plate 14 thereby preventing rotation of the brace in the U-shaped bracket 20.

It will thus be seen that the head support 10 is supported from the top front edge of the seat back by positioning means, such as the lip 18 provided on the backing plate 14, which provides a large area for contacting the heavily padded and thus yielding upper edge of the seat back. The positioning means 18 takes advantage of the fact that this area of the seat back yields with the front face of the seat back and thereby maintains the head support 10 in the proper fore and aft position in relation to the seat back. Support of the device that prevents backward tipping of the head support is provided by the brace 12. It will be noted that the brace 12 does not engage any portion of the fabric that extends across the rear of the seat back but that the lower end thereof engages the seat back at the bottom edge so as to bear against a rigid framing member of the seat. Thus, the head rest of the present invention is supported from a rigid structural member of the seat itself, does not in any way damage the upholstery of the seat back, may be readily put in place or removed as desired and does not interfere with the comfortable positioning of the user's back against the front face of the seat back.

In order to prevent the head rest from falling forward off the seat back (as when the seat back is tilted forward in a two door car to provide ingress and egress to the rear seat, or as when the car is stopped suddenly) I provide means for removably affixing the head rest to the seat. For this purpose I utilize a resilient connecting means, such as a helical spring 34 as shown in FIG. 4, affixed at its upper end to the brace 12 a distance above the lower end thereof and carrying at its other end engaging means, such as a hook 36, that releasably engages the rigid framing member 30 or other suitable portion of the seat structure in the same vicinity. One suitable means of affixing the upper end of the spring 34 to the brace 12 is illustrated in FIG. 4 and comprises a lug 38 affixed to the brace. It will be noted that the spring extends across the hinge line of the seat back, i.e., the line along which the seat back separates from the seat bottom when the seat back is tilted forward. This enables the extensibility of the spring to compensate for the tilting of the seat while, at the same time, the resiliency of the spring prevents the head rest from tilting forward and particularly prevents the lower end of the brace 12 from tipping up into the path of a person entering or leaving the rear seat.

Having thus described my invention, I claim:

1. In an automobile seat construction having an upright seat back extending upwardly from a horizontally disposed seat member; a transverse rigid frame member at the rear bottom edge of the horizontally disposed seat member; the front portion of the seat back being resilient to cushion an occupant; the improvement comprising a head support mounted on said seat back; said head support comprising a compressible head support element mounted on a rigid backing plate; said support element being positioned above the seat back; a relatively wide rigid lip extending downwardly from the backing plate into engagement with the resilient front upper edge of the seat back to support and stabilize the head support element; a rigid elongated brace detachably fastened at one end to the head support element and extending rearwardly from the head support element to a point beyond the back surface of the seat back and thence downwardly and inwardly to a point where the lower end of said brace engages the transverse rigid frame member at the rear bottom edge of the horizontal seat member; and a fabric covering for said head support element having flaps extending over the rear surface of said backing plate, a pocket portion enclosing said lip, and fastening means fixed to the lower edge of said flaps and the upper edge of said pocket portion to join said pocket portion and said flaps.

2. In an automobile seat having a substantially vertical seat back and a rigid structural member extending transversely across the bottom edge of said seat, the front portion of the seat back being resilient to cushion an occupant, said seat back being pivotally mounted for forward tipping; the improvement comprising a detachable head support mounted on said seat back; said head support comprising a cushioned head support element positioned above the seat back; a relatively wide rigid lip extending downwardly from the head support element into engagement with the resilient front upper edge of the seat back to support and stabilize the head support element; a rigid elongated brace detachably fastened at one end to the head support element; said brace extending first rearwardly from the head support element to a point beyond the back surface of the seat back and thence downwardly and inwardly to engage, at its lower end, said transverse rigid frame member; and resilient fastening means extending from a point intermediate the upper and lower ends of said brace into engagement with the lower rear edge of the seat back whereby to maintain the head support in position when the seat back is tipped forwardly.

References Cited in the file of this patent

UNITED STATES PATENTS

| | | |
|---|---|---|
| 1,597,355 | Fussell | Aug. 24, 1926 |
| 2,020,573 | Pumphrey | Nov. 12, 1935 |
| 2,661,050 | Felter | Dec. 1, 1953 |
| 2,807,313 | Kaufman | Sept. 24, 1957 |